(12) United States Patent
Mazzocco et al.

(10) Patent No.: US 10,272,740 B2
(45) Date of Patent: Apr. 30, 2019

(54) HVAC SYSTEM HAVING LINKAGE ROD WITH MID-POINT MOVEMENT CONTROL

(71) Applicant: DENSO International America, Inc., Southfield, MI (US)

(72) Inventors: Nicholas Mazzocco, Clawson, MI (US); Brian Belanger, Farmington Hills, MI (US); James Stander, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 1136 days.

(21) Appl. No.: 14/337,976

(22) Filed: Jul. 22, 2014

(65) Prior Publication Data

US 2016/0023536 A1    Jan. 28, 2016

(51) Int. Cl.
*B60H 1/24*    (2006.01)
*B60H 1/00*    (2006.01)

(52) U.S. Cl.
CPC ..... *B60H 1/00857* (2013.01); *B60H 1/00678* (2013.01); *B60H 2001/00707* (2013.01)

(58) Field of Classification Search
CPC ...... B60H 1/00857; B60H 2001/00707; B60H 1/00678
USPC .................................. 454/152, 160; 62/404
See application file for complete search history.

(56) References Cited

U.S. PATENT DOCUMENTS

| | | | | |
|---|---|---|---|---|
| 3,344,462 A | * | 10/1967 | Webster ................ | E05F 1/1253 16/357 |
| 3,643,582 A | * | 2/1972 | Mochida ................ | A62C 2/242 454/335 |
| 3,916,988 A | * | 11/1975 | Matsuda ............ | B60H 1/00842 165/42 |
| 4,515,208 A | * | 5/1985 | Sakurai ............. | B60H 1/00007 137/625.28 |
| 4,534,192 A | * | 8/1985 | Harshbarger ........... | E05B 63/20 109/59 R |

(Continued)

FOREIGN PATENT DOCUMENTS

| | | |
|---|---|---|
| DE | 102010046314 A1 | 3/2012 |
| JP | 11-344091 A * | 12/1999 |

OTHER PUBLICATIONS

Shigley, et al., Standard Handbook of Machine Design, 1986, McGraw-Hill, p. 39.15.*

*Primary Examiner* — Gregory L Huson
*Assistant Examiner* — Phillip Decker
(74) *Attorney, Agent, or Firm* — Harness, Dickey & Pierce, P.L.C.

(57) ABSTRACT

The present teachings provide for a vehicle heating, ventilation, and air conditioning ("HVAC") assembly including a drive member, a driven member, a connecting member, a guide member, a first door, and a second door. The connecting member can be rotatably coupled to the drive member and the driven member and can be configured to be moved by the drive member to rotate the driven member. The guide member can be in cooperation with the connecting member and configured to restrict movement of the connecting member as the connecting member is moved by the drive member. The first door can be configured to be rotated by the drive member between a first position and a second position. The second door can be configured to be rotated by the driven member between a third position and a fourth position.

15 Claims, 5 Drawing Sheets

(56) References Cited

U.S. PATENT DOCUMENTS

| | | | | |
|---|---|---|---|---|
| 4,614,152 A * | 9/1986 | Fukasaku | ........... | B60H 1/00678 137/625.4 |
| 5,354,234 A * | 10/1994 | Arold | ................. | B60H 1/00857 251/228 |
| 5,687,790 A * | 11/1997 | Trame | ................ | B60H 1/00021 165/103 |
| 5,727,731 A * | 3/1998 | Arakawa | ........... | B60H 1/00842 165/43 |
| 6,126,537 A * | 10/2000 | Nagano | .............. | B60H 1/00849 454/139 |
| 6,135,513 A * | 10/2000 | Hamada | .................. | E05B 77/26 292/201 |
| 6,231,437 B1 * | 5/2001 | Loup | .................. | B60H 1/00671 454/156 |
| 6,513,875 B1 * | 2/2003 | Gray | ...................... | B60N 2/206 297/354.12 |
| 6,932,402 B2 * | 8/2005 | Niwa | ................... | B60N 2/4646 296/1.09 |
| 7,793,706 B2 * | 9/2010 | Archibald | .......... | B60H 1/00064 165/202 |
| 8,025,096 B2 * | 9/2011 | Kang | ................... | B60H 1/0065 165/202 |
| 2002/0139513 A1 * | 10/2002 | Natsume | ........... | B60H 1/00064 165/42 |
| 2011/0244778 A1 * | 10/2011 | Mazzocco | .......... | B60H 1/00592 454/155 |
| 2017/0129308 A1 * | 5/2017 | Vincent | ............. | B60H 1/00521 |

\* cited by examiner

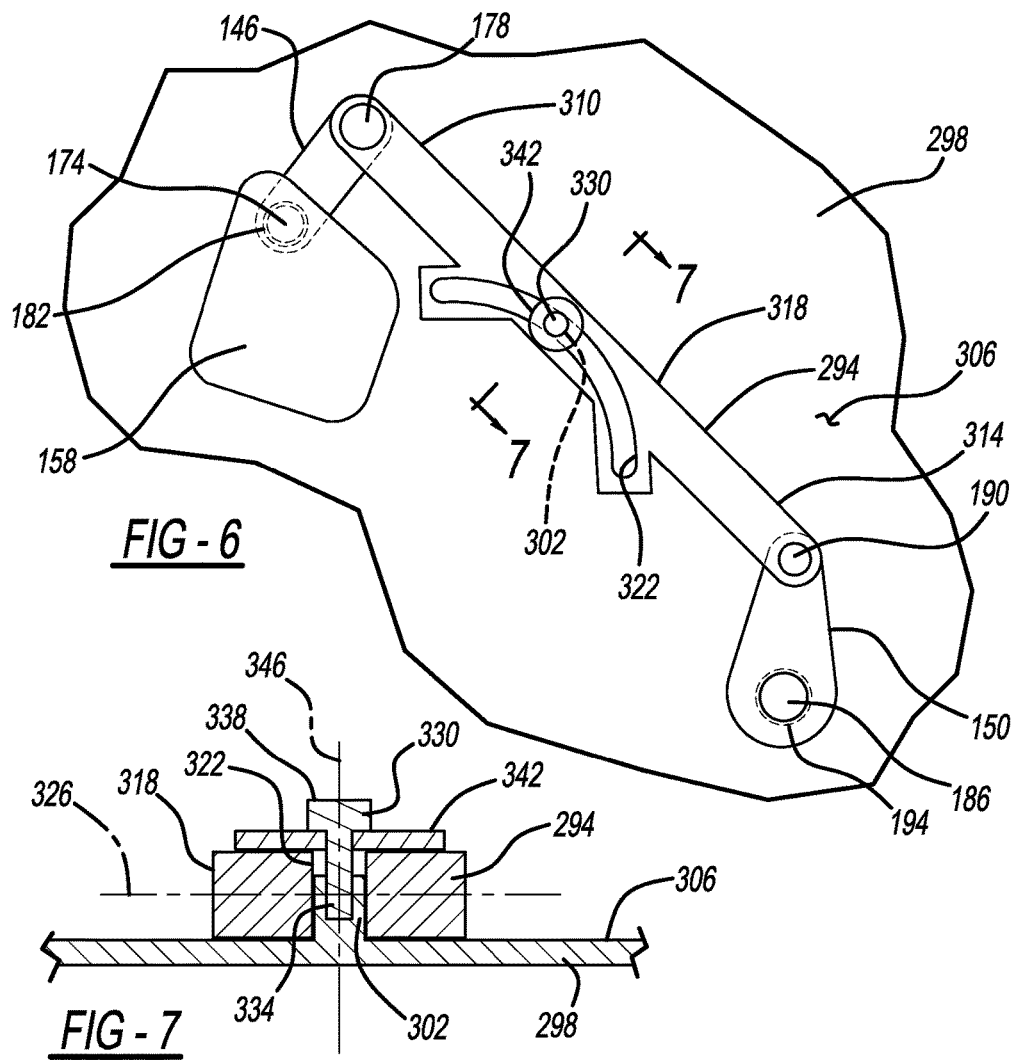
FIG-6
FIG-7
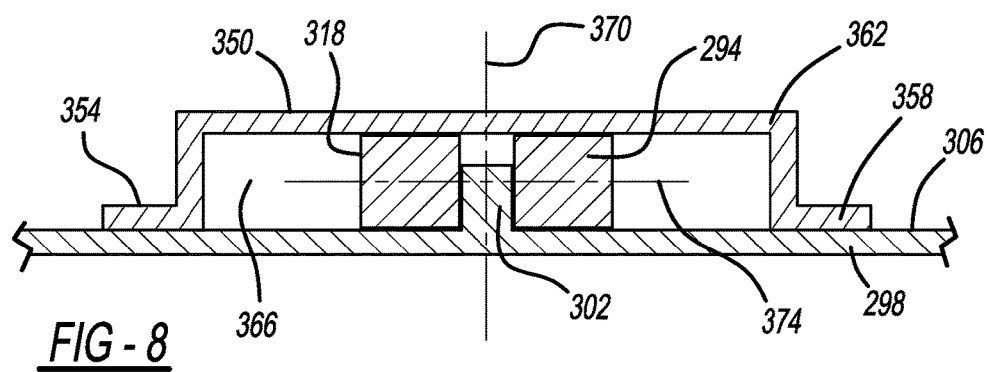
FIG-8

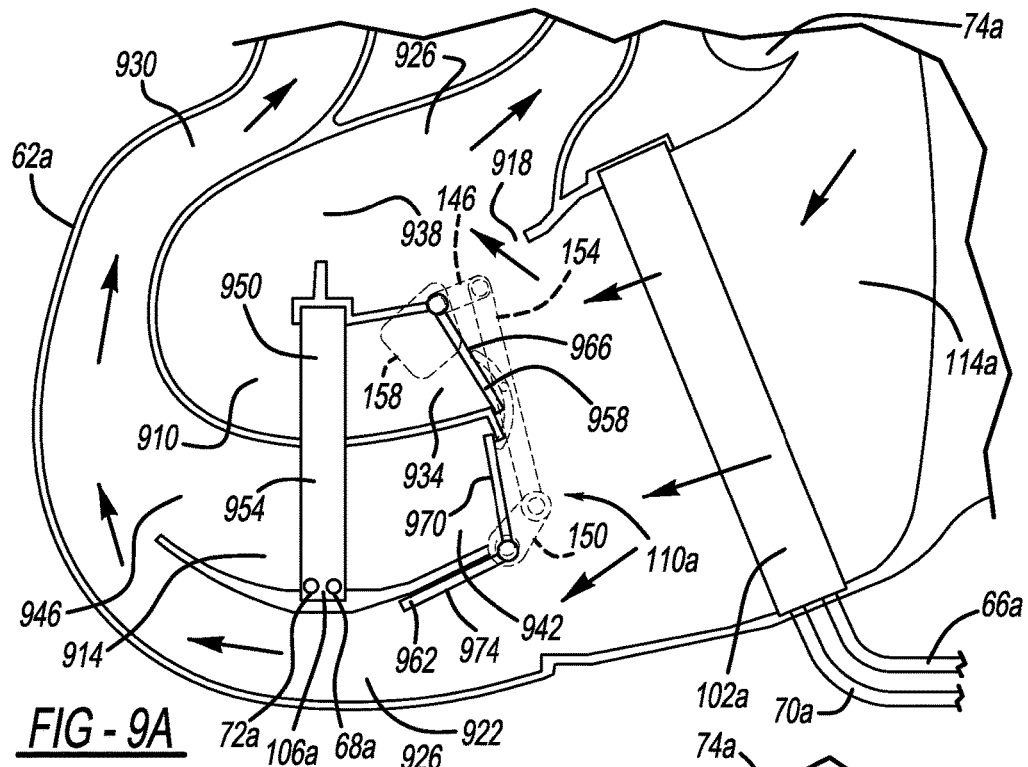
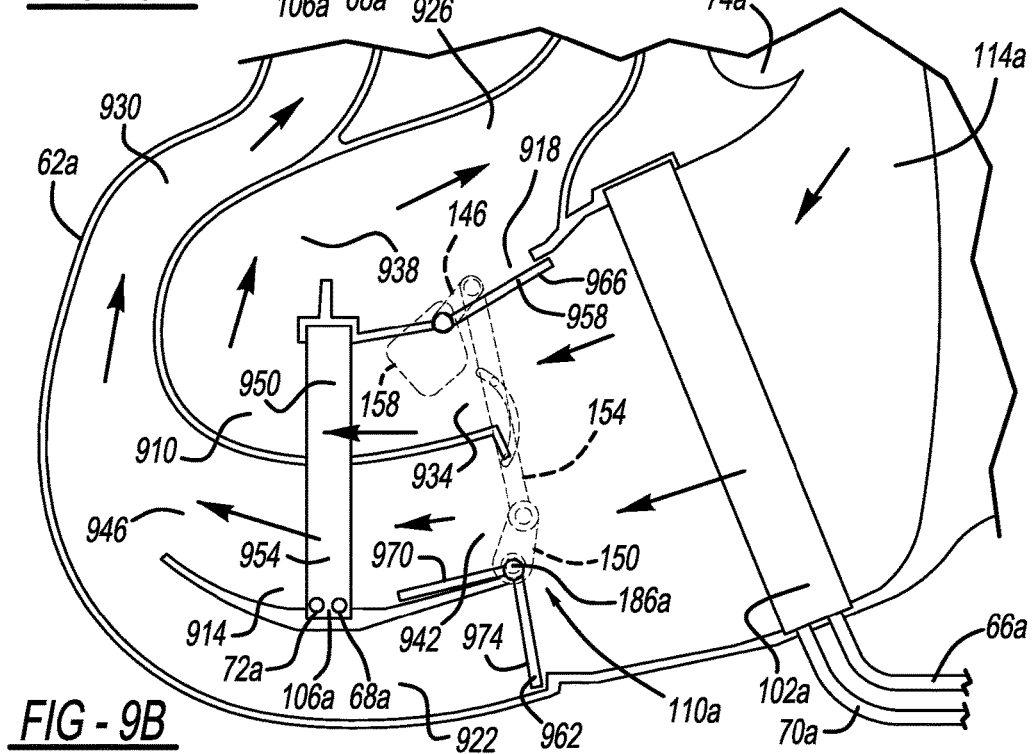

US 10,272,740 B2

HVAC SYSTEM HAVING LINKAGE ROD WITH MID-POINT MOVEMENT CONTROL

FIELD

The present disclosure relates to a vehicle heating, ventilation, and air conditioning ("HVAC") system having a linkage rod with mid-point movement control.

BACKGROUND

This section provides background information related to the present disclosure, which is not necessarily prior art.

Vehicles are known to include a heating, ventilation, and air conditioning ("HVAC") system to improve the comfort of the people within the passenger compartment of the vehicle. The HVAC system can heat and cool air blown through the HVAC system using a heating heat exchanger and/or a cooling heat exchanger. The heating heat exchanger, or heater core typically utilizes the engine coolant as a source of heat for heating the air. The cooling heat exchanger is typically an evaporator which is part of an air conditioning system in the vehicle.

Vehicle HVAC systems typically have internal passages, or ducts for routing air through various components of the system, such as the evaporator, or the heater core for example, before the air is expelled into the passenger compartment. These ducts can also route the air to different locations in the vehicle, such as to be directed toward the left, right, front, or rear of the vehicle for example.

Generally, HVAC systems can include doors, or gates within these ducts, that can be moved between opened and closed positions to selectively control airflow through the individual ducts. The position of these doors can be generally controlled by devices, such as servo motors, or linear actuators. It can be desirable to selectively control the operation of more than one of these doors simultaneously, to allow more than one duct to open, or close simultaneously.

For example, in a system with a first duct that directs airflow to a first zone of the passenger compartment, and a second duct that directs airflow to a second zone of the passenger compartment, it can be desirable to use a single motor to simultaneously control individual doors within the two ducts to selectively block airflow through the two ducts. It can be desirable to operate the two doors such that they both open the same amount to allow the same amount of air to flow to both zones. By way of another example, a first duct may direct cool air toward the passenger compartment, while a second duct directs air through the heat exchanger before directing it toward the passenger compartment. In such a system, the temperature of the air directed toward the passenger compartment can depend on the relative amounts of air directed through the first and second ducts. It can be desirable to use a single motor to simultaneously control individual doors within the two ducts to selectively regulate airflow through each duct.

Current mechanisms for actuating multiple doors from a single motor generally include a linkage rod for coupling the operation of the two doors to the single motor. These linkage rods, are typically formed of a thermoplastic material to minimize weight and cost of the components. It has been found that the linkage rod can bend or flex during operation, which can lead to incomplete sealing of the doors, or undesirable differences in the door positions. Such bending can become more pronounced when the linkage rod becomes heated, such as due to the vehicle sitting in the sun on a hot day for example. Accordingly, there exists a need for a device that reliably and accurately articulates multiple HVAC duct doors with a single motor.

SUMMARY

This section provides a general summary of the disclosure, and is not a comprehensive disclosure of its full scope or all of its features.

The present teachings provide for a vehicle heating, ventilation, and air conditioning ("HVAC") assembly including a drive member, a driven member, a connecting member, a guide member, a first door, and a second door. The connecting member can be rotatably coupled to the drive member and the driven member and can be configured to be moved by the drive member to rotate the driven member. The guide member can be in cooperation with the connecting member and configured to restrict movement of the connecting member as the connecting member is moved by the drive member. The first door can be configured to be rotated by the drive member between a first position and a second position. The second door can be configured to be rotated by the driven member between a third position and a fourth position.

The present teachings also provide for a vehicle heating, ventilation, and air conditioning ("HVAC") assembly including a drive member, a driven member, a connecting member, a guide member, a first flue set, a second flue set, a first door, and a second door. The connecting member can be rotatably coupled to the drive member and the driven member and can be configured to be moved by the drive member to rotate the driven member. The guide member can be in cooperation with the connecting member and configured to restrict movement of the connecting member as the connecting member is moved by the drive member. The first door can be configured to be rotated by the drive member between a first position and a second position. The second door can be configured to be rotated by the driven member between a third position and a fourth position. When the first door is in the first position and the second door is in the third position, air is permitted to flow through the first flue set and prevented from flowing through the second flue set. When the first door is in the second position and the second door is in the fourth position, air is prevented from flowing through the first flue set and permitted to flow through the second flue set.

The present teachings also provide for a vehicle heating, ventilation, and air conditioning ("HVAC") assembly including a heater exchanger, an evaporator, a housing, a flue door mechanism, a guide member, and a channel. The housing can define a first flue set and a second flue set. The first flue set can be configured to direct air received from the evaporator through the heat exchanger. The second flue set can be configured to direct air received from the evaporator to bypass the heat exchanger. The flue door mechanism can include a drive member, a driven member, a connecting rod, a first door, and a second door. The drive member can be rotatably coupled to the housing. The driven member can be rotatably coupled to the housing at a location spaced apart from the drive member. The connecting rod can have a first end rotatably coupled to the drive member, a second end rotatably coupled to the driven member, and a mid-section extending between the first and second ends. The first door can be disposed within the housing and can be coupled for rotation with the drive member between a first position and a second position. The second door can be disposed within the housing and can be coupled for rotation with the driven member between a third position and a fourth position. The guide member can be coupled to one of the housing and the mid-section of the connecting rod. The channel can be defined by the other of the housing and the mid-section. The guide member can be received in the channel. The channel and the guide member can cooperate to restrict movement of the connecting rod to a path defined by the channel. When the first door is in the first position and the second door is in the third position, air is permitted to flow through the first flue set and prevented from flowing through the second flue set. When the first door is in the second position and the second door is in the fourth position, air is prevented from flowing through the first flue set and permitted to flow through the second flue set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a side view of a portion of the HVAC system of FIG. 1 having a another configuration;

FIG. 7 is a cross-sectional view of the portion of the HVAC system shown in FIG. 6 taken along line 7-7 having a first configuration;

FIG. 8 is a cross-sectional view of the portion of the HVAC system shown in FIG. 6 taken along line 7-7 having a second configuration;

FIG. 9A is a cross-sectional view of a portion of an HVAC system of another configuration with a mechanism in a first position; and FIG. 9B is the cross-section view of FIG. 9A with the mechanism in a second position.

Corresponding reference numerals indicate corresponding parts throughout the several views of the drawings.

DETAILED DESCRIPTION

Example embodiments will now be described more fully with reference to the accompanying drawings.

Figure 1:
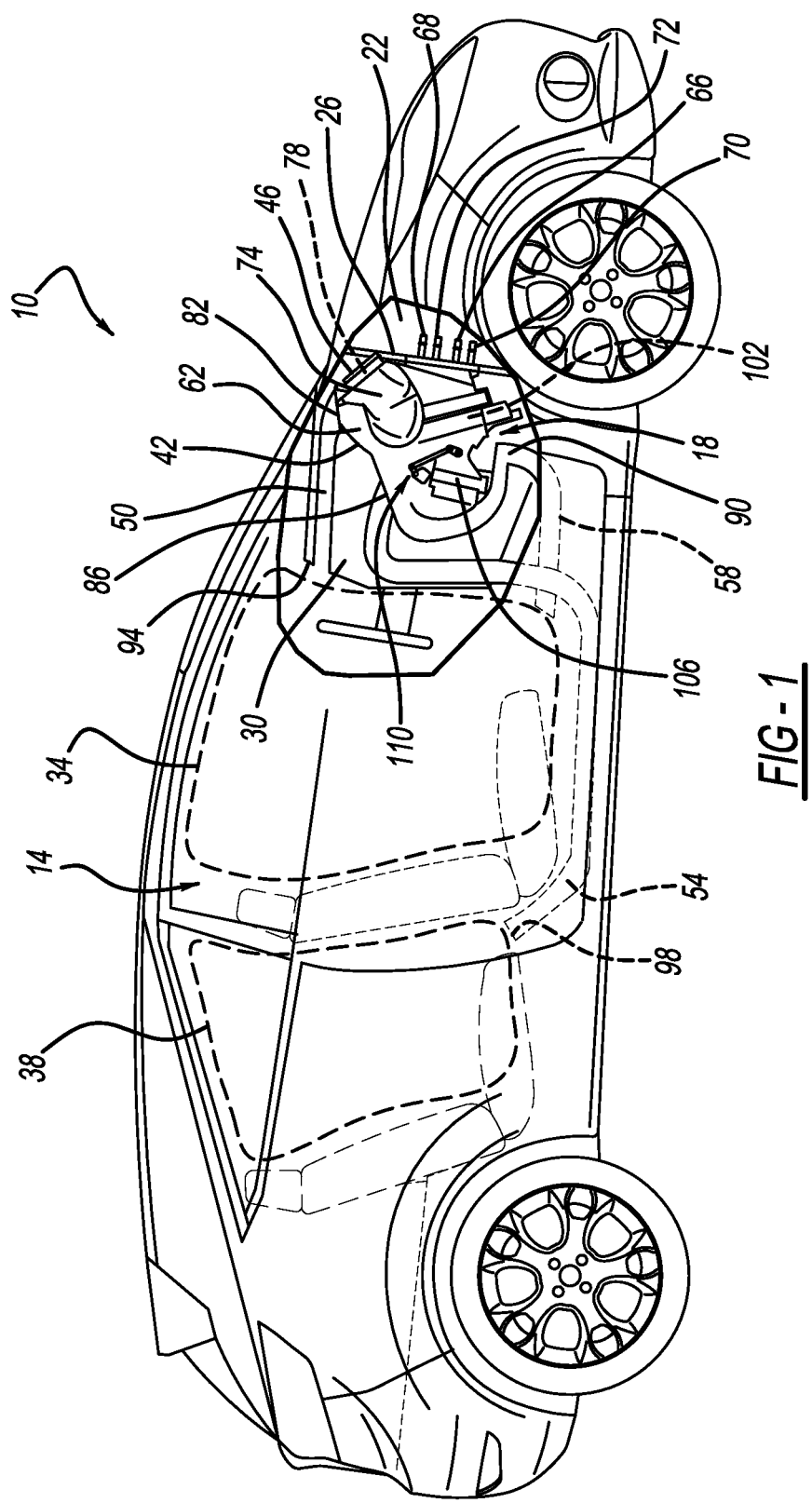
FIG. 1 is a side view of a vehicle having a heating, ventilation, and air conditioning ("HVAC") system in accordance with the present disclosure.

With reference to FIG. 1, a vehicle 10 is shown having a passenger compartment 14, a heating, ventilation, and air conditioning ("HVAC") system 18, an engine compartment 22, a firewall 26, and a dashboard, or instrument panel 30. The passenger compartment 14 is configured for vehicle occupants (not shown) to operate, ride in, or otherwise occupy the vehicle 10. The passenger compartment 14 can generally be divided into a first zone 34 and a second zone 38. In the example provided, the first zone 34 generally includes the front portion of the passenger compartment 14, and the second zone 38 generally includes the rear portion of the passenger compartment 14. However, it is understood that alternative, or additional divisions of the passenger compartment can be used, such as the left, or right portions for example. The engine compartment 22 can generally include an engine (not shown), an engine coolant system (not shown), and a compressor (not shown). The engine coolant system can typically include a radiator and water pump configured to circulate a coolant fluid through a plurality of conduits in the engine to remove heat from the engine for example. The firewall 26 can generally separate the passenger compartment 14 and instrument panel 30 from the engine compartment 22. The instrument panel 30 can generally be between the passenger compartment 14 and the firewall 26. The instrument panel 30 can generally house a plurality of instruments (not shown), such as dials, displays, or controls for operating, viewing, or accessing navigation, entertainment, communications, or vehicle operational information for example. While the vehicle 10 in the example provided is shown as a car, it is understood that the HVAC system 18 can be used in other vehicles, such as a truck, or an agricultural, or military vehicle for example.

The HVAC system 18 can include an HVAC main unit 42, an intake duct 46, a first zone duct 50, a second zone duct 54, and any suitable number of additional ducts (such as lower duct 58). The main unit 42 can be located within the vehicle 10, such as generally between the instrument panel 30 and the firewall 26. The main unit 42 can generally be configured to supply air to anyone or more of the ducts 50, 54, 58.

The main unit 42 can include a main housing 62, a refrigerant supply line 66, a heater supply line 68, a refrigerant return line 70, a heater return line 72, and a blower housing 74. The main housing 62 can define an intake port 78, a first air port 82, a second air port 86, and can also define additional ports, such as a lower port 90. The blower housing 74 can house a blower (not shown) configured to draw air from within the passenger compartment 14, and/or from outside the vehicle 10, through the intake duct 46 by way of the intake port 78, and blow the air through the main housing 62, as will be described below. The intake duct 46 can be configured to receive the air from the passenger compartment 14 and/or outside the vehicle 10. The refrigerant supply line 66 and refrigerant return line 70 can be fluid conduits that extend through the firewall 26 into the engine compartment 22. The refrigerant supply line 66 can supply refrigerant to the main unit 42, from the compressor (not shown). The refrigerant return line 70 can allow the refrigerant to return from the main unit 42, to the compressor. The main unit 42 will be described in greater detail below.

The first zone duct 50 can extend from the first air port 82, to the first zone 34 of the passenger compartment 14, and can be configured to supply air from the main unit 42 to the first zone 34. The first zone duct 50 can be generally disposed within the instrument panel 30, or between the instrument panel 30 and the firewall 26, and can extend through the instrument panel 30 to expel air through one or more first vents 94 mounted in the instrument panel 30. While the example shows the first vents 94 located in the instrument panel 30, it is understood that the first vents 94 can alternatively, or additionally be located in other locations proximate to the first zone 34, such as below the instrument panel 30 to provide air toward an occupant's feet for example.

The second zone duct 54 can extend from the second air port 86, to the second zone 38 of the passenger compartment 14, and can be configured to supply air from the main unit 42 to the second zone 38. The second zone duct 54 can extend from the second air port 86, to the second zone 38 to expel air through one or more second vents 98 proximate to the second zone 38. In the example provided, the second zone duct 54 extends along the lower portion of the passenger compartment, such as through a center console (not shown) for example. However, it is understood that the second zone duct 54 can extend to the second zone 38 along other paths, such as through a headliner of the vehicle 10 for example.

Figure 2:
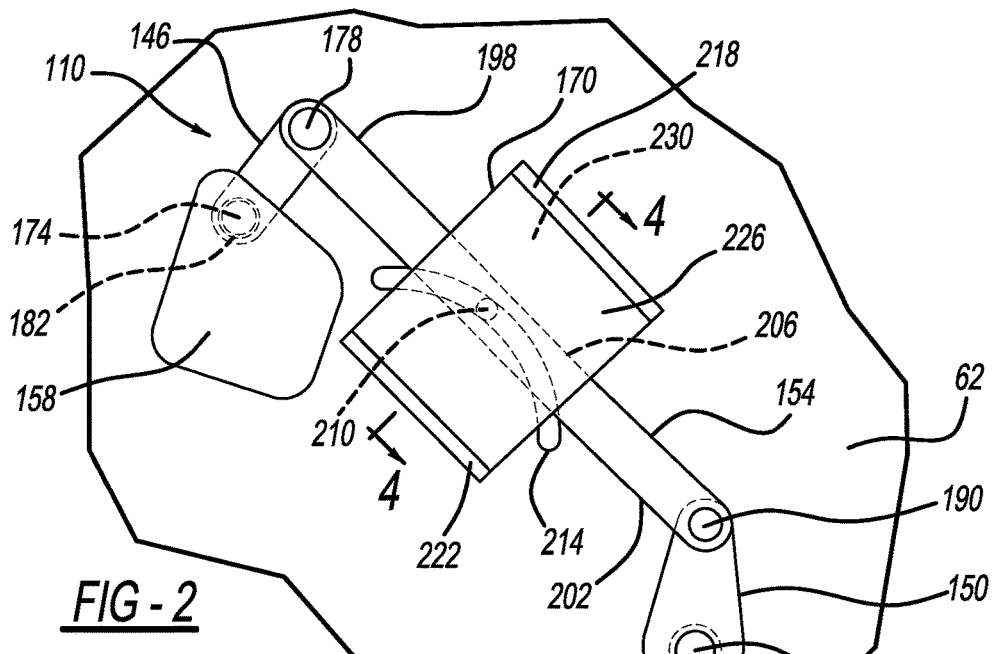
FIG. 2 is a side view of a portion of the HVAC system of FIG. 1.
Figure 3A:
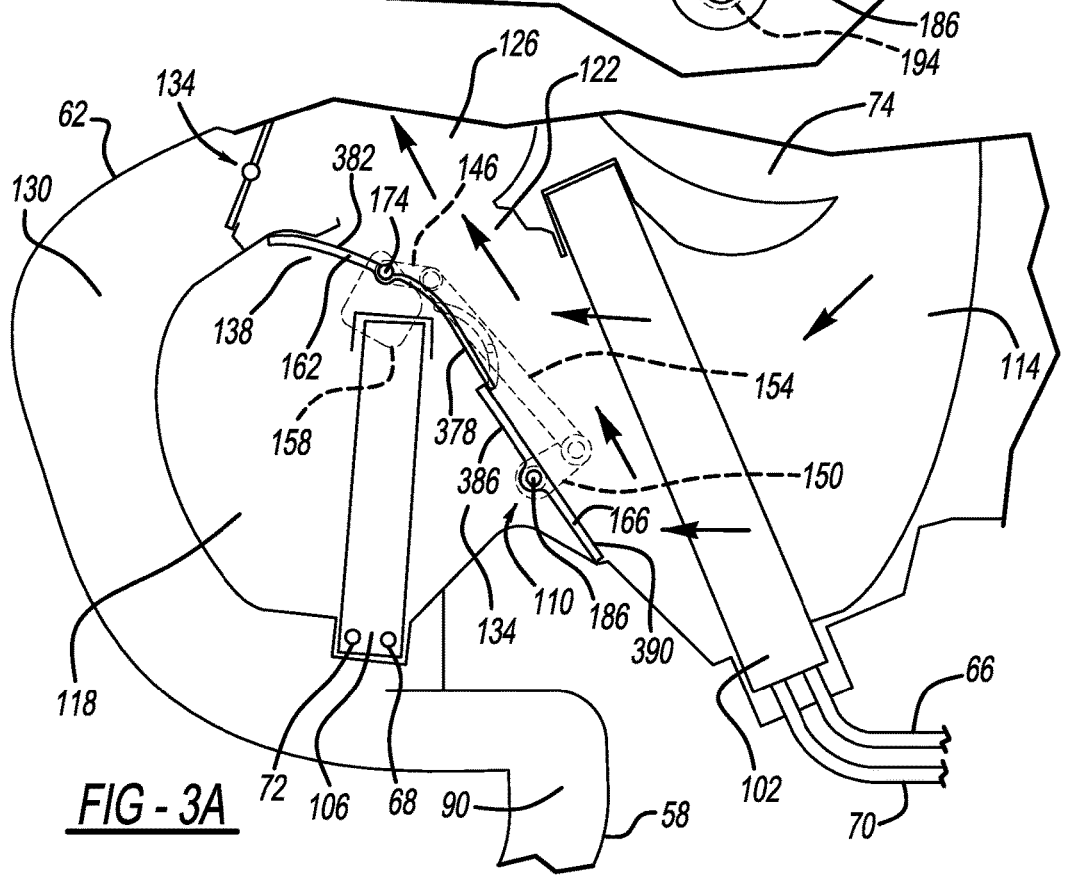
FIG. 3A is a cross-sectional view of a portion of the HVAC system of FIG. 1 with a mechanism in a first position.
Figure 3B:
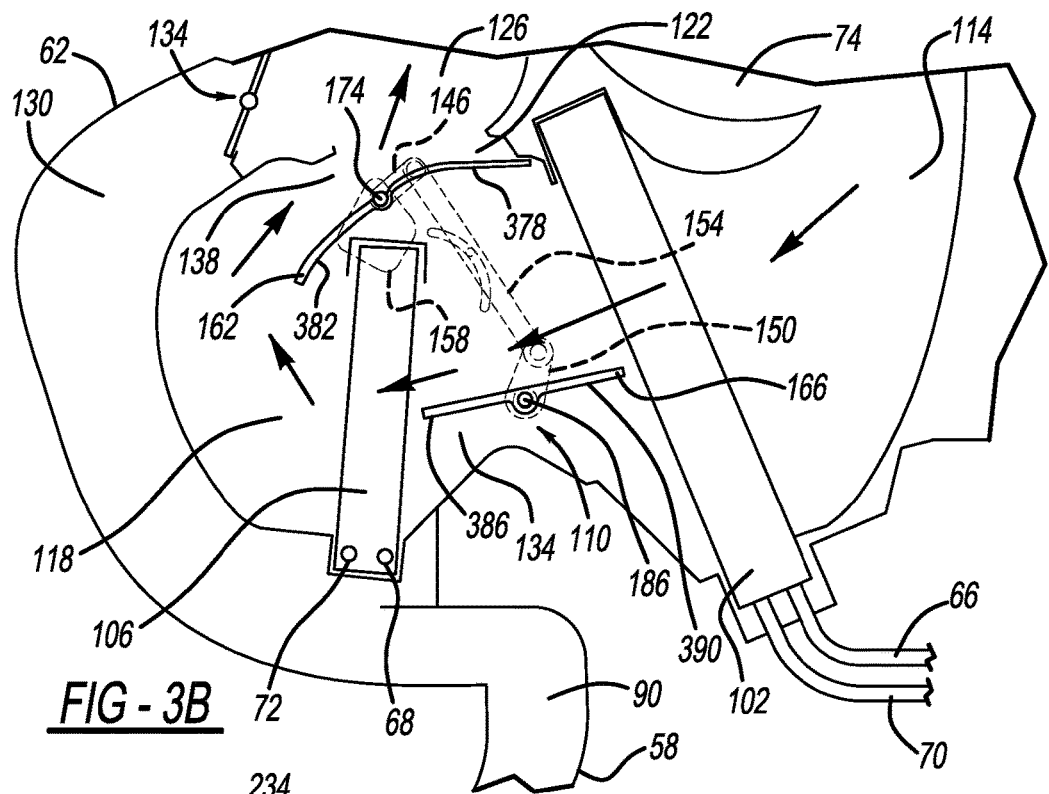
FIG. 3B is the cross-sectional view of FIG. 3A with the mechanism in a second position.

With additional reference to FIGS. 2, 3A, and 3B, the main unit 42 is illustrated in greater detail. The main unit 42 can further include a cooling heat exchanger or evaporator 102, a heating heat exchanger or heater core 106, and a flue door mechanism 110. The main housing 62 can define an air supply flue 114, a hot air flue 118, a cool air flue 122, and a main flue 126, each configured to convey air through the main housing 62. The main housing 62 can also define a lower flue 130.

The evaporator 102 can be any type of heat exchanger, such as a radiator for example. The evaporator 102 can be located within the main housing 62 and in line with the air supply flue 114. The evaporator 102 can be coupled to the refrigerant supply line 66 and the refrigerant return line 70 and can have a series of tubes (not shown), configured for the refrigerant fluid to pass through while flowing from the refrigerant supply line 66 to the refrigerant return line 70. The evaporator 102 is configured such that air flowing through the air supply flue 114 can flow across the tubes. The refrigerant fluid can generally absorb heat from the air as the air passes across the tubes of the evaporator 102, to lower the temperature of the air and remove moisture from the air. The heated refrigerant fluid can then return to the compressor via the refrigerant return line 70.

The heater core 106 can be any type of heat exchanger, such as a radiator for example. It is understood that the heater core 106 can alternatively, or additionally include an electrical heating element. The heater core 106 can be located within the main housing 62 and in line with the hot air flue 118. The heater core 106 can be coupled to heater supply and return lines 68, 72, which can be configured to supply the heater core 106 with a heating fluid, such as engine coolant that has been heated by the engine for example. Similar to the refrigerant supply and return lines 66, 70, the heater supply and return lines 68 and 72 can pass through the firewall 26 and into the engine compartment 22, where the heating fluid is heated by the engine. The heating fluid can pass through a series of tubes (not shown) within the heater core 106, while flowing from the heater supply line to the heater return line. The heater core 106 is configured such that air flowing through the hot air flue 118 can flow across the tubes. The heating fluid can generally release heat to the air as it passes across the heater core 106 tubes.

The air supply flue 114 can be fluidly coupled with the blower housing 74 and intake port 78 to receive air therefrom. The hot air flue 118 can have an inlet 134 and an outlet 138. The inlet 134 can be proximate to the air supply flue 114, to receive air therefrom. The outlet 138 can be proximate to the main flue 126, such that air can flow from the hot air flue 118 to the main flue 126 through the outlet 138. The cool air flue 122 can be proximate to the air supply flue 114 and the main flue 126, such that air can flow from the air supply flue 114, through the cool air flue 122, to the main flue 126 without flowing through the hot air flue 118. The main flue 126 can be fluidly coupled to the first air port 82 and the second air port 86 to provide air to the first and second zones ducts 50, 54. The main flue 126 can also be fluidly coupled to the lower port 90 by the lower flue 130. In this configuration, additional mechanisms 142 can be included to selectively provide air from the main flue 126 to one or more of the first air port 82, the second air port 86, and the lower port 90. The lower port 90 can be coupled to the lower duct 58, which can direct air to the lower portion of the first zone 34.

With particular reference to FIG. 2, for example, the flue door mechanism 110 can include a drive link 146, a driven link 150, a connecting link 154, and an actuator 158. A first door 162 and a second door 166 of the flue door mechanism 110 are illustrated in FIGS. 3A and 3B for example. Since FIGS. 3A and 3B illustrate a cross-sectional view of the main unit 42, the actuator 158, drive link 146, connecting link 154, and driven link 150 are illustrated in dashed lines to indicate their locations and general positions relative to the main unit 42 and the first and second doors 162, 166. The flue door mechanism 110 can also include a link cover 170. The drive link 146 can have a first, or drive pivot 174, and a second pivot 178. The drive pivot 174 can be rotatably coupled to the main housing 62. In the example shown, the drive pivot 174 is a pin non-rotatably coupled to the drive link 146 and rotatably received in an aperture 182 of the main housing 62, though other configurations can be used. The second pivot 178 can be spaced radially apart from the drive pivot 174 and configured to rotate about the drive pivot 174.

The driven link 150 can have a third, or driven pivot 186, and a fourth pivot 190. The driven pivot 186 can be spaced apart from the drive pivot 174 and rotatably coupled to the main housing 62. In the example shown, the driven pivot 186 is a pin non-rotatably coupled to the driven link 150 and rotatably received in an aperture 194 of the main housing 62, though other configurations can be used. The fourth pivot 190 can be spaced radially apart from the driven pivot 186 and configured to rotate about the driven pivot 186.

The connecting link 154 can be formed of a thermoplastic material and can have a first end 198, a second end 202, and a central rod 206 extending between the first and second ends 198, 202. In the example provided, the connecting link 154 is a rigid, linear rod, though other configurations can be used. The central rod 206 can have a guide member or support member 210 and the main housing 62 can define a groove 214. It is understood that the main housing 62 can include or can be constructed of a plurality of individual pieces and that the groove 214 can be defined by one of such pieces mounted to or integrally formed with the other(s) of such pieces. The groove 214 can have a generally arcuate path coinciding with the movement of the support member 210, as will be discussed below.

The support member 210 can generally be located toward the middle of the central rod 206, and can be integrally formed with the central rod 206. The support member 210 can be received within the groove 214 and can slide along the groove 214 as the connecting link 154 is moved between positions, as will be discussed below. The groove 214 can be generally arcuate in shape to coincide with the path of the connecting link 154 and support member 210. The drive link 146 can be rotatably coupled to the first end 198 of the connecting link 154 at the second pivot 178, and the driven link 150 can be rotatably coupled to the second end 202 of the connecting link 154 at the fourth pivot 190. In this way, the connecting link 154 couples the drive link 146 and driven link 150 as a four-bar linkage, such that rotation of the drive link 146 at the drive pivot 174 causes rotation of the driven link 150 at the driven pivot 186. The degree of rotation of the driven link 150 relative to the drive link 146 depends on the relative lengths of the drive link 146 and driven link 150. In the example provided, the relative lengths are generally similar, though other lengths can be used. The support member 210 and groove 214 cooperate to prevent the connecting link 154 from flexing, or bending perpendicular to the path of the groove 214.

Figure 4:
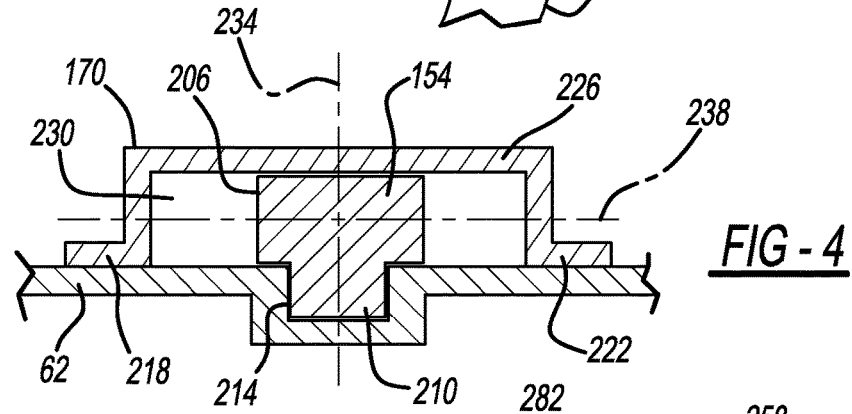
FIG. 4 is a cross-sectional view of the portion of the HVAC system shown in FIG. 2 taken along line 4-4 having a first configuration.

With reference to FIGS. 2 and 4, the link cover 170 can have a first flange 218 and a second flange 222, a cap 226 and can define a link cavity 230. The link cover 170 can be coupled to the main housing 62 at the first and second flanges 218, 222 by any suitable means, such as a fastener (not shown), or adhesive for example. At least a portion of the central rod 206 can be received in the link cavity 230 between the cap 226 and the main housing 62. The link cover 170 can cover at least the portion of the central rod 206 and main housing 62 such that the connecting link 154 can translate between the link cover 170 and the main housing 62 when the drive link 146 rotates. The cap 226 can prevent the central rod 206 from moving along axis 234, thus preventing the connecting link 154 from bending away from the main housing 62, and preventing the support member 210 from disengaging the groove 214. In this way, the link cover 170 and main housing 62 prevents the connecting link 154 from bending along axis 234, while the support member 210 and groove 214 cooperate to prevent the connecting link 154 from bending in the direction perpendicular to the path of the groove 214, as indicated by axis 238. In the example provided, the link cover 170 covers a middle section of the central rod 206, however it is understood that the link cover 170 could also cover the entire connecting link 154, the drive link 146, the driven link 150, and/or the actuator 158.

Figure 5:
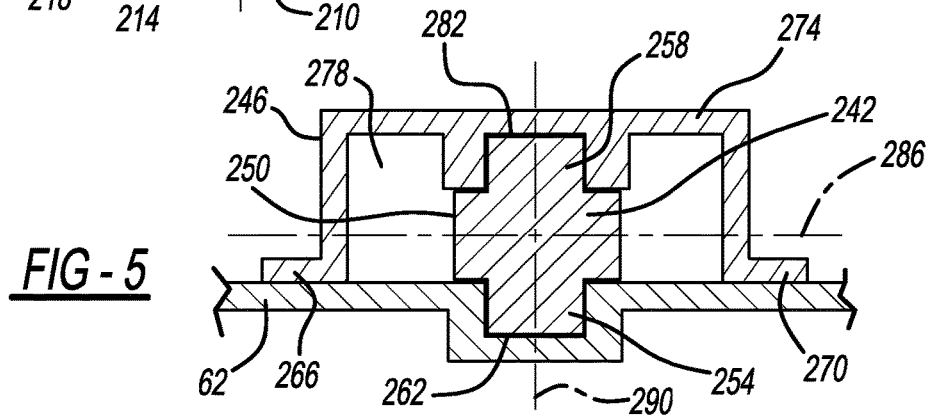
FIG. 5 is a cross-sectional view of the portion of the HVAC system shown in FIG. 2 taken along line 4-4 having a second configuration.

With reference to FIG. 5, a section view of another configuration of a connecting link 242, and a link cover 246 for use with the flue door mechanism 110 and the main housing 62 is shown. Connecting link 242 can be substantially similar to connecting link 154, having first and second ends (not shown), substantially similar to first and second ends 198, 202, and a central rod 250, substantially similar to central rod 206, except central rod 250 includes a first guide member or first support member 254 and a second guide member or second support member 258. The main housing 62 can define a first groove 262. As described above, it is understood that the main housing 62 can include or can be constructed of a plurality of individual pieces and that the first groove 262 can be defined by one of such pieces mounted to or integrally formed with the other(s) of such pieces. The first support member 254 can be substantially similar to support member 210 and first groove 262 can be substantially similar to groove 214 such that first support member 254 rides in first groove 262 in a similar manner. The second support member 258 can be substantially similar to the first support member 254, except the second support member 258 extends from a side of the connecting link 242 opposite the first support member 254. The link cover 246 can be substantially similar to link cover 170, having a first flange 266, a second flange 270, and a cap 274, and defining a link cavity 278, except the cap 274 can define a second groove 282. The second groove 282 can be arcuate in shape and can be substantially similar to the first groove 262 formed in the main housing 62. The second support member 258 can be received in the second groove 282 and can slide along the second groove 282 as the connecting link 242 is moved between positions. The first support member 254 and first groove 262, as well as the second support member 258 and second groove 282 cooperate to prevent the connecting link 242 from flexing, or bending perpendicular to the path of the second groove 282, as indicated by axis 286. The cap 274 and main housing 62 cooperate to prevent the connecting link 242 from bending in the direction away from the main housing 62, as indicated by axis 290. While the example provided includes the first support member 254 and first groove 262, it is understood that the first support member 254 and first groove 262 could alternatively be eliminated, such that only the second support member 258 and second groove 282 are used.

With reference to FIGS. 6 and 7, another configuration of a connecting link 294 and a main housing 298 is shown. The main housing 298 is substantially similar to main housing 62, except that instead of the groove 214, the main housing 298 defines a guide member or support member 302. The support member 302 can extend from an outer surface 306 of the main housing 298. It is understood that the main housing 62 can include or can be constructed of a plurality of individual pieces and that the support member 302 can extend from one of such pieces mounted to or integrally formed with the other(s) of such pieces. The connecting link 294 can be substantially similar to connecting link 154, having a first end 310, a second end 314, and a central rod 318, except that instead of support member 210, the central rod 318 defines a groove 322. The groove 322 can be generally arcuate in shape. The support member 302 can be received in the groove 322 and can slide along the groove 322 as the connecting link 294 is moved between positions. The groove 322 and support member 302 cooperate to prevent the connecting link 294 from flexing, or bending in the direction perpendicular to the path of the groove 322, indicated by axis 326. The support member 302 can also be configured to receive a pin 330. The pin 330 can have a generally cylindrical body 334 and a head 338. The body 334 can be received through the groove 322 and engage the support member 302. The body be fastened to the support member 302 by a plurality of threads (not shown) or other means. The head 338 can be configured to hold a washer 342 between the head 338 and the connecting link 294. The washer 342 can be a diameter larger than the diameter of the groove 322, such that the head 338 and washer cooperate to prevent the connecting link 294 from bending in the direction along axis 346. It is understood that the head 338 and washer 342 can be integrally formed together.

With reference to FIG. 8, another configuration of the connecting link 294 and main housing 298 is shown. A link cover 350, substantially similar to link cover 170, can have first and second flanges 354, 358, a cap 362, and defines a link cavity 366. The first and second flanges 354, 358 can be coupled to the main housing 298 by any suitable means, such as fasteners (not shown) or adhesive for example. The link cover 350 acts similarly to link cover 170 to prevent connecting link 294 from bending, in the direction along axis 370, while the support member 302 and groove 322 prevent the connecting link 294 from bending in the direction perpendicular to the groove 322, indicated by axis 374.

Returning to FIGS. 2, 3A and 3B, the actuator 158 can be coupled to the drive link 146 to drive rotation of the drive link 146 at the drive pivot 174. In the example provided, the actuator 158 is a servo motor having an output shaft (not shown) coupled to the drive pivot 174, though other actuator types can be used, such as a linear actuator with a rack and pinion for example.

With specific reference to FIGS. 3A and 3B, the first door 162 can be disposed within the main housing 62 and can be rotatably coupled to the main housing 62 at the drive pivot 174, while being non-rotatably coupled to the drive link 146 for common rotation at the drive pivot 174. The first door 162 can have a first damper portion 378 and a second damper portion 382, each extending radially outward from the drive pivot 174. The second door 166 can be disposed within the main housing 62 and can be rotatably coupled to the main housing 62 at the driven pivot 186, while being non-rotatably coupled to the driven link 150 for common rotation at the driven pivot 186. The second door 166 can have a third damper portion 386 and a fourth damper portion 390, each extending radially outward from the driven pivot 186. In this way, the first and second doors 162, 166 are both articulated when the actuator 158 rotates the drive link 146.

The first door 162 and second door 166 can be configured to rotate between a closed position (FIG. 3A) and an open position (FIG. 3B). In the closed position, the first damper portion 378 can be positioned to block part of the inlet 134, while the second damper portion 382 can be positioned to block the outlet 138 to prevent air from flowing through the outlet 138 of the hot air flue 118. In the closed position, the third damper portion 386 and fourth damper portion 390 can block the remainder of the inlet 134 of the hot air flue 118 to prevent cool air from the evaporator 102 from entering the hot air flue 118 and coming in contact with the heater core 106. The third damper portion 386 can sealingly engage the first damper portion 378 to prevent air from flowing through the inlet 134 between the first and second doors 162, 166. The cool air flue 122 is open, and generally all of the air is directed to flow directly from the evaporator 102 and air supply flue 114, through the cool air flue 122, and to the main flue 126, in order to provide maximum cool air to the passenger compartment.

In the open position of FIG. 3B, the first damper portion 378 can block the cool air flue 122 to prevent cool air from flowing from the air supply flue 114, through the cool air flue, to the main flue 126. The first damper portion 378 can be positioned to allow air to flow from the air supply flue 114, through the inlet 134, and to the heater core 106. In the open position, the second damper portion 382 can be positioned to allow air to flow through the outlet 138 and to the main flue 126. In the open position, the second door 166 can be positioned to allow air to flow from the evaporator 102, through the inlet 134, to the heater core 106, and through the outlet 138, to the main flue 126. In this position, generally all of the air flow received by the main flue 126 is heated by the heater core 106 to provide maximum heating of the air.

With reference to FIGS. 9A and 9B, cross-sectional views of a second configuration of the main unit 42 are shown. The reference numbers similar to the reference numbers of FIGS. 1-3B denote similar components. Similarly, the actuator 158, drive link 146, connecting link 154, driven link 150, and support member 210 are shown in dashed lines to indicate their locations and general positions relative to the main unit 42 and the components illustrated within the main unit 42. Accordingly, only the differences will be described in detail, and the descriptions of the similar components of FIGS. 1-3B are incorporated by reference with respect to the similarly numbered components. In this configuration, the main housing 62a defines an air supply flue 114a, a first hot flue 910, a second hot flue 914, a first cool flue 918, a second cool flue 922, a first main flue 926, and a second main flue 930. The first hot flue 910 can have a first inlet 934 and a first outlet 938. The first inlet 934 can be proximate to the air supply flue 114, to receive air therefrom. The first outlet 938 can be proximate to the first main flue 926, such that air can flow from the first hot flue 910 to the first main flue 926 through the first outlet 938. The first cool flue 918 can be proximate to the air supply flue 114 and the first main flue 926, such that air can flow from the air supply flue 114, through the first cool flue 918, to the first main flue 926 without flowing through the first or second hot flues 910, 914. The first main flue 926 can be fluidly coupled to the first air port 82 to provide air to the first zone duct 50.

The second hot flue 914 can have a second inlet 942 and a second outlet 946. The second inlet 942 can be proximate to the air supply flue 114, to receive air therefrom. The second outlet 946 can be proximate to the second main flue 930, such that air can flow from the second hot flue 914 to the second main flue 930 through the second outlet 946. The second cool flue 922 can be proximate to the air supply flue 114 and the second main flue 930, such that air can flow from the air supply flue 114, through the second cool flue 922, to the second main flue 930 without flowing through the first or second hot flues 910, 914. The second main flue 930 can be fluidly coupled to the second air port 86 to provide air to the second zone duct 54.

The heater core 106a can be located within the main housing 62a and in line with the first and second hot flues 910, 914. The first and second hot flues 910, 914 can divide the heater core 106a into two portions 950, 954, such that air passing through the heater core 106a via the first hot flue 910 remains separate from air passing through the heater core 106a via the second hot flue 914. The evaporator 102a can be located within the main housing 62a and in line with the air supply flue 114a. The air supply flue 114 can be fluidly coupled with the blower housing 74a and intake port 78 to receive air therefrom.

The flue door mechanism 110a can be generally similar to the flue door mechanism 110, having drive link 146, driven link 150, connecting link 154, actuator 158, a first door 958, and a second door 962. While the present example shows the flue door mechanism 110a as having connecting link 154 shown in FIG. 2, it is understood that flue door mechanism 110a can alternatively use a connecting rod configured similar to connecting links 242, or 294, shown in FIG. 5, and FIGS. 6-8, in conjunction with the respective configurations of the main housings 298, and/or link covers 170, 246, 350, or pin 330. The first door 958 can be disposed within the main housing 62a and can be rotatably coupled to the main housing 62a at the drive pivot 174, while being non-rotatably coupled to the drive link 146 for common rotation at the drive pivot 174. The first door 958 can have a first damper portion 966 extending radially outward from the drive pivot 174. The second door 962 can be disposed within the main housing 62a and can be rotatably coupled to the main housing 62a at the driven pivot 186, while being non-rotatably coupled to the driven link 150 for common rotation at the driven pivot 186. The second door 962 can have a second damper portion 970 and a third damper portion 974, each extending radially outward from the driven pivot 186. In this way, the first and second doors 958, 962 are both articulated when the actuator 158 rotates the drive link 146.

The first door 958 and second door 962 can be configured to rotate between a closed position (FIG. 9A) and an open position (FIG. 9B). In the closed position, the first damper portion 966 can be positioned to block the first inlet 934 to prevent air from flowing from the air supply flue 114, through the first hot flue 910. In this position, the first damper portion 966 is positioned such that the first cool flue 918 is open to allow air to flow from the air supply flue 114a, through the first cool flue 918, and to the first main flue 926. In this position, maximum cool air can be provided to the first zone 34. The second damper portion 970 can be positioned to block the second inlet 942 to prevent air from flowing from the air supply flue 114a, through the second hot flue 914. In this position, the third damper portion 974 can be positioned such that the second cool flue 922 is open to allow air to flow from the air supply flue 114a, through the second cool flue 922, and to the second main flue 930. In this position, maximum cool air can be provided to the second zone 38.

In the open position, the first damper portion 966 can block the first cool flue 918 to prevent cool air from flowing directly from the air supply flue 114a, to the first main flue 926, through the first cool flue 918. The first damper portion 966 is positioned such that the first inlet 934 is open to allow air to flow from the air supply flue 114a, through the first hot flue 910, to the first main flue 926. In this position, maximum heating of the air directed to the first zone 34 is achieved. The second damper portion 970 can be positioned such that the second inlet 942 is open to allow air to flow from the air supply flue 114a, through the second hot flue 914, to the second main flue 930. The third damper portion 974 can block the second cool flue 922 to prevent cool air from flowing directly from the air supply flue 114a, to the second main flue 930, through the second cool flue 922. In this position, maximum heating of the air directed to the second zone 38 is achieved.

Thus, the present teachings provide for an HVAC system with a mechanism that can use a single linkage rod to accurately actuate multiple doors spaced apart within HVAC flues. The HVAC system of the present teachings overcomes the limitations of prior HVAC door mechanisms by mechanically preventing the linkage rod from flexing or bending outside of its desired movement path with minimal additional components or complexity. The present HVAC system thus allows the use of lighter weight materials in a four-bar linkage mechanism while maintaining consistent articulation of the flue doors, even when the mechanism components become heated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle heating, ventilation, and air conditioning ("HVAC") assembly comprising:
   a drive member;
   a driven member;
   a connecting member rotatably coupled to said drive member and said driven member and configured to be moved by said drive member to rotate said driven member, the connecting member is a rigid, linear rod;
   an arcuate groove defined by the connecting member;
   a guide member received within said arcuate groove and configured to restrict movement of said connecting member in a direction perpendicular to a path of the arcuate groove as said connecting member is moved by said drive member, the guide member is spaced apart from, and between, the drive member and the driven member;

a pin extending through the arcuate groove and into cooperation with the guide member to prevent the connecting member from bending in a direction perpendicular to a longitudinal axis of the connecting member;

a first door configured to be rotated by said drive member between a first position and a second position;

a second door configured to be rotated by said driven member between a third position and a fourth position; and a housing, the first and second doors are disposed within the housing, the guide member extends from the housing and is received within the arcuate groove, the guide member restricts movement of the connecting member to a path defined by the groove.

2. The vehicle HVAC assembly of claim 1, wherein said drive member has a first end and a second end, said first end being rotatably coupled to said housing and non-rotatably coupled to said first door, said second end being rotatably coupled to said connecting member.

3. The vehicle HVAC assembly of claim 2, wherein said driven member has a third end and a fourth end, said fourth end being rotatably coupled to said housing and non-rotatably coupled to said second door, said third end being rotatably coupled to said connecting member.

4. The vehicle HVAC assembly of claim 1, wherein said first door is configured to allow airflow through a first flue while preventing airflow through a second flue when in said first position, and configured to prevent airflow through said first flue while allowing airflow through said second flue when in said second position.

5. The vehicle HVAC assembly of claim 4, wherein said second door is configured to allow airflow through said first flue when in said third position, and configured to prevent airflow through said first flue when in said fourth position.

6. The vehicle HVAC assembly of claim 5, wherein said first flue is configured to route air through a heat exchanger.

7. The vehicle HVAC assembly of claim 4, wherein said second door is configured to allow airflow through a third flue while preventing airflow through a fourth flue when in said third position, and configured to prevent airflow through said third flue while allowing airflow through said fourth flue when in said fourth position.

8. The vehicle HVAC assembly of claim 7, wherein said first and third flues are configured to route air through a heat exchanger, said first and second flues are configured to route air to a first zone of the vehicle, and said third and fourth flues are configured to route air to a second zone of the vehicle.

9. A vehicle heating, ventilation, and air conditioning ("HVAC") assembly comprising:
a drive member;
a driven member;
a connecting member rotatably coupled to said drive member and said driven member and configured to be moved by said drive member to rotate said driven member, the connecting member is a rigid, linear rod;
an arcuate groove defined by the connecting member;
a guide member received within said arcuate groove and configured to restrict movement of said connecting member in a direction perpendicular to a path of the arcuate groove as said connecting member is moved by said drive member, the guide member is spaced apart from, and between, the drive member and the driven member;

a pin extending through the arcuate groove and into cooperation with the guide member to prevent the connecting member from bending in a direction perpendicular to a longitudinal axis of the connecting member;

a first flue set;
a second flue set;
a first door configured to be rotated by said drive member between a first position and a second position;
a second door configured to be rotated by said driven member between a third position and a fourth position; and
a housing, the first and second doors are disposed within the housing, the guide member extends from the housing and is received within the arcuate groove, the guide member restricts movement of the connecting member to a path defined by the groove;

wherein:
when said first door is in said first position and said second door is in said third position, air is permitted to flow through said first flue set and restricted from flowing through said second flue set; and
when said first door is in said second position and said second door is in said fourth position, air is restricted from flowing through said first flue set and permitted to flow through said second flue set.

10. The HVAC assembly of claim 9, wherein said first flue set is configured to route air through a heat exchanger and said second flue set is configured to direct air around said heat exchanger.

11. The HVAC assembly of claim 9, wherein said first flue set includes a first flue and a second flue, and said second flue set includes a third flue and a fourth flue, said first and second flues configured to route air through a heat exchanger, said third and fourth flues configured to direct air around said heat exchanger, and wherein said first and third flues are configured to route air to a first zone of the vehicle, and said second and fourth flues are configured to route air to a second zone of the vehicle.

12. The vehicle HVAC assembly of claim 9, wherein said drive member has a first end and a second end, said first end being rotatably coupled to said housing and non-rotatably coupled to said first door, said second end being rotatably coupled to said connecting member.

13. The vehicle HVAC assembly of claim 12, wherein said driven member has a third end and a fourth end, said fourth end being rotatably coupled to said housing and non-rotatably coupled to said second door, said third end being rotatably coupled to said connecting member.

14. A vehicle heating, ventilation, and air conditioning ("HVAC") assembly comprising:
a heat exchanger;
an evaporator;
a housing defining a first flue set and a second flue set, said first flue set configured to direct air received from said evaporator through said heat exchanger, said second flue set configured to direct air received from said evaporator to bypass said heat exchanger;
a flue door mechanism including:
a drive member rotatably coupled to said housing;
a driven member rotatably coupled to said housing at a location spaced apart from said drive member;
a connecting rod having a first end rotatably coupled to said drive member, a second end rotatably coupled to said driven member, and a mid-section extending between said first and second ends;

an arcuate groove defined by the mid-section of the connecting rod;

a first door disposed within said housing and coupled for rotation with said drive member between a first position and a second position; and a second door disposed within said housing and coupled for rotation with said driven member between a third position and a fourth position;

a guide member extending from the housing and received within said arcuate groove, the guide member restricts movement of the connecting rod to a path defined by the groove and prevents movement in a direction perpendicular to a path of the arcuate groove as the connecting rod is moved by the drive member, the guide member is spaced apart from, and between, the drive member and the driven member; and a pin extending through the arcuate groove and into cooperation with the guide member to prevent the connecting rod from bending in a direction perpendicular to a longitudinal axis of the connecting rod;

wherein:

when said first door is in said first position and said second door is in said third position, air is permitted to flow through said first flue set and is restricted from flowing through said second flue set;

when said first door is in said second position and said second door is in said fourth position, air is restricted from flowing through said first flue set and permitted to flow through said second flue set.

15. The vehicle HVAC assembly of claim 14, wherein said first flue set includes a first flue and a second flue, and said second flue set includes a third flue and a fourth flue, said first and second flues being configured to route air through a heat exchanger, said third and fourth flues being configured to direct air around said heat exchanger, and wherein said first and third flues are configured to route air to a first zone of the vehicle, and said second and fourth flues are configured to route air to a second zone of the vehicle.

* * * * *